United States Patent
Sakai

(10) Patent No.: US 7,384,179 B2
(45) Date of Patent: Jun. 10, 2008

(54) PLANAR LIGHT SOURCE UNIT AND IMAGE DISPLAY APPARATUS USING THE SAME

(75) Inventor: Seiji Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/623,961

(22) Filed: Jan. 17, 2007

(65) Prior Publication Data

US 2007/0165424 A1   Jul. 19, 2007

(30) Foreign Application Priority Data

Jan. 18, 2006   (JP)  ............... 2006-009712

(51) Int. Cl.
    *G02F 1/335* (2006.01)
(52) U.S. Cl. .................... 362/632; 362/634
(58) Field of Classification Search ........... 349/58–66; 362/632–634

See application file for complete search history.

(56) References Cited

U.S. PATENT DOCUMENTS

| | | | | |
|---|---|---|---|---|
| 6,330,150 B1* | 12/2001 | Kim | ........................... | 361/683 |
| 7,106,393 B2* | 9/2006 | Lee | ............................. | 349/58 |
| 7,118,267 B2* | 10/2006 | Li et al. | ..................... | 362/632 |
| 7,154,570 B2* | 12/2006 | Lee | ............................. | 349/58 |

| | | | | |
|---|---|---|---|---|
| 2002/0075667 A1* | 6/2002 | Kawashima et al. | .......... | 362/26 |
| 2007/0002590 A1* | 1/2007 | Jang et al. | ................... | 362/633 |

FOREIGN PATENT DOCUMENTS

JP    11-143383    5/1999

OTHER PUBLICATIONS

U.S. Appl. No. 11/623,909, filed Jan. 17, 2007, Sakai et al.
U.S. Appl. No. 11/623,961, filed Jan. 17, 2007, Sakai.
U.S. Appl. No. 11/624,488, filed Jan. 18, 2007, Sakamoto et al.

* cited by examiner

*Primary Examiner*—Sandra O'Shea
*Assistant Examiner*—Anabel M Ton
(74) *Attorney, Agent, or Firm*—Oblon, Spivak, McClelland, Maier & Neustadt, P.C.

(57) ABSTRACT

A planar light source unit includes: a light source; an upper case having an opening through which the light is emitted from the light source; a lower case fitted with the upper case and including a hole; a light guide plate disposed inside the upper case and the lower case; a resin frame including a first surface that holds the light guide plate, a second surface opposed to the first surface, a first restriction member penetrated through the hole of the lower case, the first restriction member including a first portion extending from and substantially perpendicular to the second surface, and a second portion contacted with a portion of the first portion and having a third surface substantially parallel to the second surface; and a first member, a part of which is inserted into a clearance defined by the second surface, the first portion and the third surface.

9 Claims, 6 Drawing Sheets

PLANAR LIGHT SOURCE UNIT AND IMAGE DISPLAY APPARATUS USING THE SAME

BACKGROUND OF THE INVENTION

1. Field of the Invention

The present invention relates to a planar light source unit and an image display apparatus using such planar light source unit and, specifically, the invention relates to a planar light source unit including a mechanical fastening method for fastening together a resign frame and a lower case without increasing the number of parts, the method being highly reliable in a wide temperature range, and an image display apparatus using the planar light source unit.

2. Description of the Related Art

A liquid crystal display device, a signboard, a guide light and the like are not a display device of a self-light-emission type that the image display part thereof itself emits the light. In these display devices of a non-self-light-emission type, it is necessary to mount a planar light source unit such as a back light on the counter-light-emission side (the rear surface) of the image display part. Now, description will be given below of a planar light source unit to be installed on the back surface of a liquid crystal panel as a representative example of an image display apparatus.

As the planar light source unit, depending on the position of arrangement of a light source, there are available a side light type light source unit and a direct type light source unit. In the planar light source unit of a side light type (which is also referred to as an edge light type), a light source is arranged on the side surface of a case; and, in the planar light source unit of a direct type, a light source is arranged on the counter-light-emission side of a case in such a manner that it is opposed to the liquid crystal panel. Further, the side light type planar light source unit includes a light source unit which uses a light guide plate in order to guide the light from the light source to an opening formed in the case. In the planar light source unit using a light guide plate, the light, which has been guided from a side light portion including a line light source such as a CCFL (Cold Cathode Fluorescent Lamp) or from a point light source such as a light emitting diode (which is hereinafter referred to as an LED), is reflected within the light guide plate and is diffused according to a diffusion pattern provided within the light guide plate, whereby the light can be taken out from the opening in a planar manner.

According to a general planar light source unit, on two or more portions of the peripheral edge of an upper case (which can also be referred to as an upper frame), there are formed fixing pawls by press working, and these fixing pawls are bent and caulked to the pawl receiving portions of the periphery of a lower case (which can also be referred to as a lower frame), thereby fixing the upper and lower cases to each other (JP-A-11-143383, FIG. 21).

Recently, as the display screen of the liquid crystal display device increases, the frame of the case tends to become further narrower, which makes it difficult to keep the mechanical strength of the liquid crystal display device.

In view of this, according to JP-A-11-143383, the peripheral edge of the upper case of the liquid crystal device is bent and caulked onto the peripheral edge surface of the lower case to thereby provide two or more fixing pawls for fixing the upper and lower cases to each other on the peripheral edge of the upper case. Thus, in a state where the fixing pawls are bent and caulked onto the peripheral edge surface of the lower case, after the light guide plate of the planar light source unit is mounted, the fixing pawls each has a length extending up to a position to allow holding of the upper case through the lower case, thereby being able to hold the mechanical strength of the liquid crystal display device (Patent Reference 1, FIGS. 1 and 3).

However, when holding the following parts of the planar light source unit between the upper and lower cases, that is, a light guide plate, an optical sheet and a resin frame having not only a function to reflect the light emitted from the side surface of the light guide plate again onto the light guide plate but also a screwing and mounting function to connect the planar light source unit to an external case, the mechanical fastening method as disclosed in JP-A-11-143383 is not able to provide sufficient strength and reliability. That is, in order to employ a light source such as an LED capable of generating a relatively large amount of heat and thus to attain a wide temperature range of use, it is necessary that, for radiation of the heat, the lower case is increased in size to cover the entire surface of the counter-light-emission side of the case. In this case, especially, the heat generated from the light source at high temperatures is diffused into the lower case and is further diffused to the resin frame as well, so that the resin frame becomes relatively high in temperature. Here, when a member such as a metal case or a printed circuit board having a thermal expansion coefficient different from the material of the resin frame is fixedly secured to the resin frame firmly, the resin frame is distorted due to the difference between the irrespective thermal expansion coefficients. Such distortion, when it becomes large, has a mechanical influence on the reflecting sheet and light guide plate, which gives rise to variations in the luminance of the planar light source unit at high temperatures.

SUMMARY OF THE INVENTION

In view of the above circumstances of the above planar light source unit, it is an object of the invention to provide a planar light source unit which can reduce the distortion of a resin frame caused by temperature to thereby enhance the mechanical reliability thereof, and an image display apparatus using such planar light source unit.

According to an aspect of the invention, there is provided a planar light source unit of the invention includes: a light source; an upper case having an opening through which the light is emitted from the light source; a lower case fitted with the upper case and including a hole; a light guide plate disposed inside the upper case and the lower case; a resin frame including a first surface that holds the light guide plate, a second surface opposed to the first surface, a first restriction member penetrated through the hole of the lower case, the first restriction member including a first portion extending from and substantially perpendicular to the second surface, and a second portion contacted with a portion of the first portion and having a third surface substantially parallel to the second surface; and a first member, a part of which is inserted into a clearance defined by the second surface, the first portion and the third surface.

According to another aspect of the invention, there is provided an image display device including the planar light source unit of the above aspect and an image display part disposed on the planar light source unit for displaying images using the light radiated from the planar light source unit.

DETAILED DESCRIPTION OF THE PREFERRED EMBODIMENTS

Now, description will be given below of an embodiment of a liquid crystal display apparatus according to the invention with reference to the accompanying drawings. In order to avoid duplicate and extensive description, elements used in common in the respective drawings or elements having equivalent functions are given the same designations.

Embodiment 1

Figure 1:
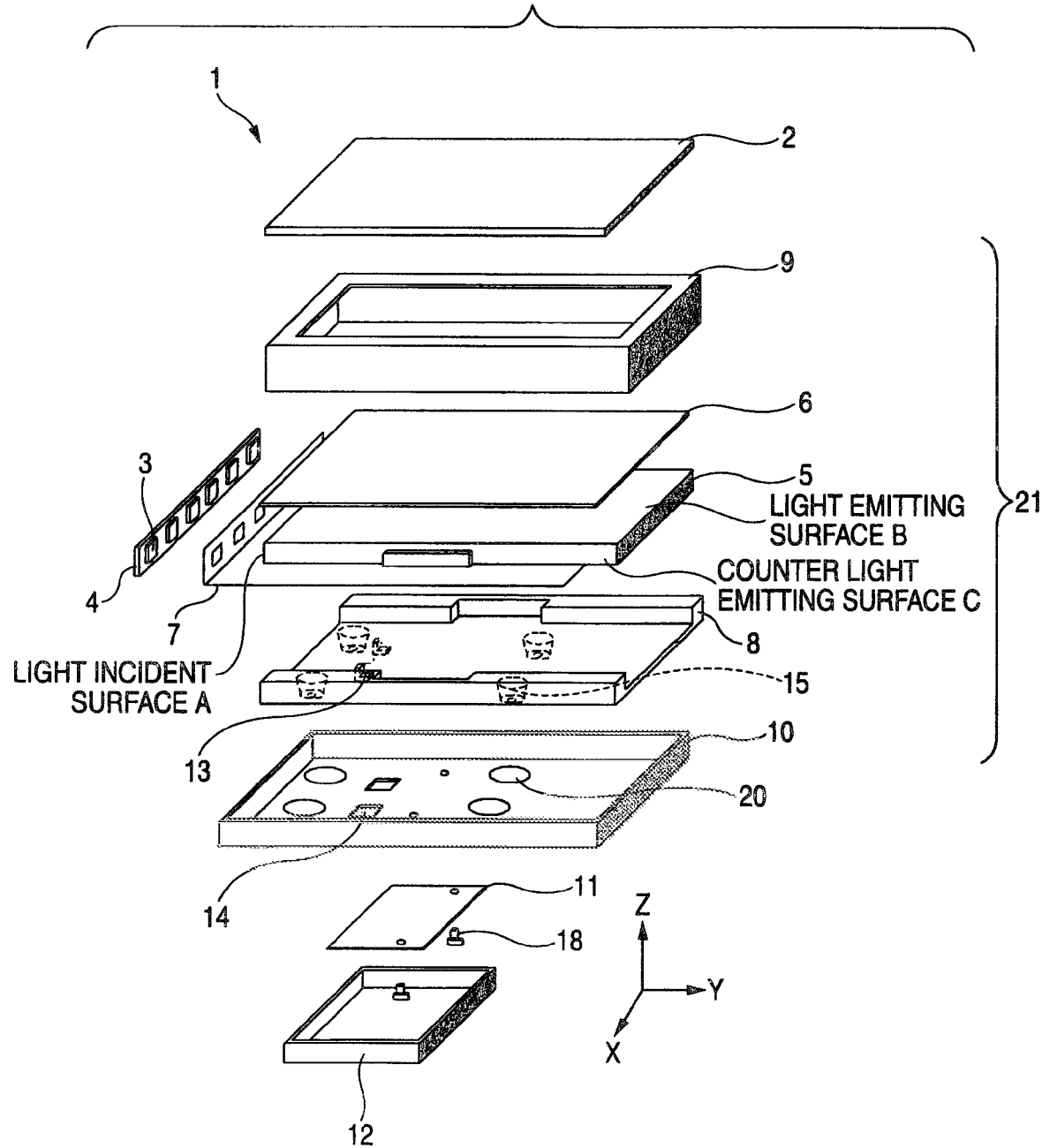
FIG. 1 is an exploded perspective view of a liquid crystal display apparatus according to an embodiment 1 of the invention.
Figure 2:
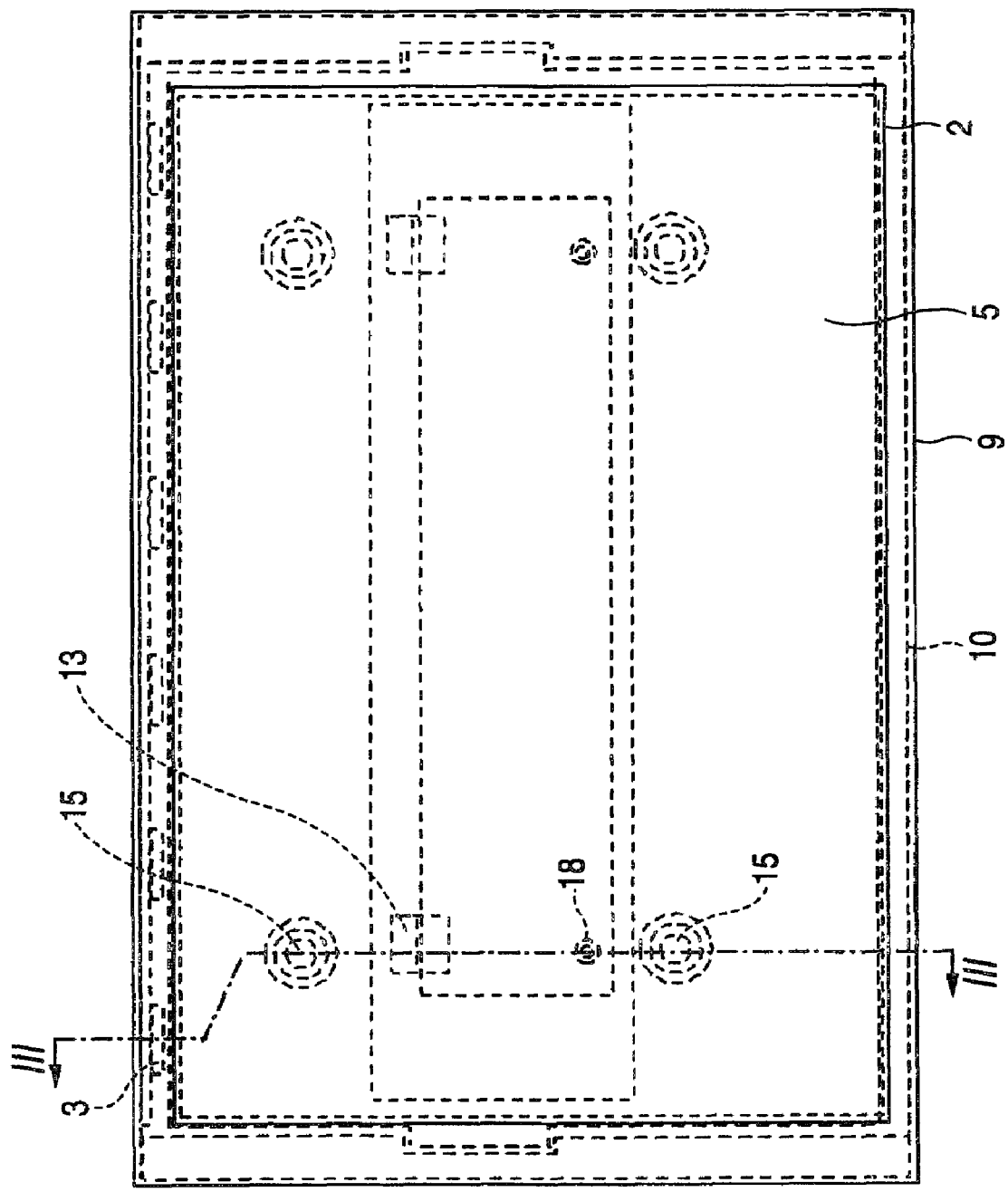
FIG. 2 is a plan view of a liquid crystal display apparatus according to an embodiment 1 of the invention.

FIG. 1 shows an exploded perspective view of a liquid crystal display apparatus 1 according to the present embodiment, and FIG. 2 shows a plan view (a conceptual view) thereof, respectively. The liquid crystal display apparatus 1 shown in FIG. 1 includes a liquid crystal display part 2 and a planar light source unit 21; and, within the planar light source unit 21, there are arranged two or more LEDs 3 in a line, while the LEDs 3 are respectively connected to a light source substrate 4. Also, the LEDs 3 are disposed in the vicinity of one side surface (the side surface through which the light from a light source enters is hereinafter referred to as a light incident surface A) of a light guide plate 5, while the light having entered the light guide plate 5 through the light incident surface A is emitted from the light emitting surface B of the light guide plate 5. (Here, the light emitting surface is the plane of the light guide plate which faces the liquid crystal display part 2. The term "light emitting surface" is hereinafter used when the front and back of the light guide plate 5, a reflecting sheet 7, a lower case 10 and the like are specified.)

On the light emitting surface B side of the light guide plate 5, there is disposed an optical sheet member 6; and, on the counter light emitting surface C side, there is disposed the reflecting sheet 7. (Here, the term "counter light emitting surface" is the surface of the light guide plate 5 that is opposite to the surface thereof facing the liquid crystal display part 2. This term is hereinafter used when specifying the front and back of the light guide plate 5, reflecting sheet 7, lower case 10 and the like.) The reflecting sheet 7 is extended to the light incident surface A side as well, while the portion of the reflecting sheet 7 that corresponds to the LEDs 3 is removed. In the planar light source unit 21, the LEDs 3, light source substrate 4, light guide plate 5, optical sheet member 6, reflecting sheet 7 and resin frame 8 are held by and between an upper case 9 and the lower case 10.

In the upper case 9, there is formed an opening, while the present opening corresponds to the light emitting surface B of the light guide plate 5. Therefore, the planar light source unit 21 is capable of emitting the planar light that comes through the present opening. As can be understood from a plan view of the liquid crystal display apparatus 1 shown in FIG. 2, the liquid crystal display apparatus 1 is designed such that the above-mentioned opening exists inside the light guide plate 5. (FIG. 2 is a conceptual view and, in this figure, the liquid crystal display apparatus 1 is reduced to about one half in the vertical direction.)

Next, as shown in FIG. 1, the LEDs 3 are mounted on the light source substrate 4 at given intervals. The light source substrate 4 with the LEDs 3 mounted thereon is fixedly secured to the lower case 10 by an adhesive material 19 (see FIG. 3) in such a manner that it faces the light incident surface A of the light guide plate 5. In FIG. 1, the LEDs 3 and light source substrate 4 are disposed only on one side surface of the light guide plate 5. However, the LEDs and light source substrate may also be disposed on two or more side surfaces of the light guide plate 5.

Here, the light source substrate 4 holds the LEDs 3 in a line and includes a circuit pattern (not shown) which is used to drive the LEDs 3. Since the light source substrate 4 contains a metal core substrate, the heat that is generated from the LEDs 3 mounted on the light source substrate 4 can be radiated to its peripheral portion efficiently. Also, when the LEDs 3 are mounted on the light source substrate 4 using a thin FPC (Flexible Printed Circuit), the heat from the LEDs 3 can be diffused to its peripheral portion with more efficiency. Use of the FPC in the light source substrate 4 further provides another effect that the outside size of the planar light source unit 21 can be reduced.

According to the present embodiment, the light guide plate 5 includes a transparent acrylic resin. However, the light guide plate 5 may include, for example, polycarbonate resin or glass, etc. In the counter light emitting surface C of the light guide plate 5, there is formed a light scattering portion (not shown) which is used to scatter the propagation direction of the light to thereby guide the light to the light emitting surface B. This light scattering portion functions as means for reflecting the light toward the inside of the light guide plate 5. More specifically, as the above-mentioned light reflecting means, for example, there is any one of following means: a dot pattern printed on the counter light emitting surface C of the light guide plate 5; the counter light emitting surface C having a rough surface; and an uneven portion formed in the counter light emitting surface C to change the propagation direction of the light of a minute spherical surface or a prism.

Also, when the light emitting surface B is satin finished to thereby form an uneven portion thereon without forming the light scattering portion in the counter light emitting surface C of the light guide plate 5, there can also be obtained a similar effect to the above. That is, when an uneven portion is formed in the light emitting surface B of the light guide plate 5, the propagation direction of the light to be emitted from the present light emitting surface B is scattered by the uneven portion formed in the light emitting surface B. As a result of this, some of the light emitted from the light emitting surface B is reflected toward the inside of the light guide plate 5, while the remaining light is emitted from the light emitting surface B to the outside of the light guide plate 5.

Therefore, when a satin finishing processing is performed only on the light emitting surface B of the light guide plate 5, it is not necessary to provide reflecting means on the other remaining surfaces. The satin finishing processing performed on the light emitting surface B provides a similar effect to, for example, a dot pattern printed on the counter light emitting surface C and thus functions as the reflecting means.

On the light guide plate 5, there is disposed the optical sheet member 6 including two or more optical sheets. The optical sheet member 6 employs a structure in which, for example, a lens sheet is held by and between diffusion sheets. When enhancing the luminance of the planar light source unit 21, with the direction of a prism formed on the surface of the lens sheet taken into consideration, two or more lens sheets may also be combined and used together. Also, in the case of the above-mentioned diffusion sheet, in order to enhance the diffusion performance thereof, two or more diffusion sheets may be used together in combination.

Further, depending on the light distribution property of the lens sheet, the optical sheet member 6 may use a single lens sheet or may not use any lens sheet. The optical sheet member 6 may also be formed by combining together a protection sheet and a lens sheet or a polarizing and reflecting sheet. The optical sheet member 6 may preferably be optimized from the viewpoint of the desired luminance, light distribution property and the like.

Next, for the reflecting sheet 7, there is used the material containing PP (Polypropylene) or PET (Polyethylene Terephthalate) mixed with barium sulfide or titanium oxide. Also, as the material of the reflecting sheet 7, there may also be used, for example, a material containing resin with minute air bubbles formed therein, or a material containing a metal plate with silver vacuum evaporated thereon, or a material containing a metal plate with paint including titanium oxide coated thereon. The reflecting sheet 7 may preferably have a reflectance of 90% or more. For this purpose, two or more reflecting sheets 7 may be superimposed to thereby enhance the reflectance thereof. As the reflectance of the reflecting sheet 7 is enhanced, the luminance in the opening is increased.

Also, when a dot pattern is printed on the light emitting surface side or counter light emitting surface side of the reflecting sheet 7, the uniformity of the luminance of the light emitting surface B of the light guide plate 5 can be improved. Further, by performing a colored printing on the reflecting sheet 7, color variation on the light emitting surface caused by the absorption of the light by the light guide plate 5 or by the absorption of the light by the reflecting sheet 7 can be cancelled. That is, since the printing on the counter light emitting surface side of the reflecting sheet 7 can reduce influences on the light emitting surface B, minute luminance variations or minute color variations on the light emitting surface B can be corrected.

According to the present embodiment, as shown in FIG. 1, the reflecting sheet 7 is disposed on the counter light emitting surface C side of the light guide plate 5 and is also extended toward the LEDs 3 side up to the side surface (light incident surface A) of the light guide plate 5. And, the reflecting sheet 7 is arranged in parallel to the light source substrate 4. However, the reflecting sheet 7 is disposed in such a manner that it avoids coving the LEDs 3 portion. Also, by disposing the reflecting sheet 7 on the side surface of the light guide plate 5, the light emitted from the side surface of the light guide plate 5 can be made to enter the light guide plate 5 again. According to this, the light can be used with good efficiency and thus the luminance of the light emitting surface B can be enhanced. Also, although not shown in FIG. 1, by disposing the reflecting sheet 7 on the other side surfaces as well than the light incident surface A, the light emitted from the side surfaces can be returned to the light guide plate 5, thereby being able to enhance the luminance of the light emitting surface B.

Next, the upper case 9 includes the opening and the light can be emitted from the present opening. The upper case 9 is structured such that the light is prevented from leaking to the outside as much as possible from the other remaining portions thereof than the opening. According to the present embodiment, as the material of the upper case 9, there is used aluminum. However, as the material of the upper case 9, there can also be used other materials, for example, a metal material such as stainless steel or iron, or a resin material such as PC (Polycarbonate) or ABS (Acrylonitrile-Butadiene-Styrene).

Next, the lower case 10 has a function to conduct the heat discharged from the LEDs 3 and discharge it to its peripheral portions. Therefore, the lower case 10 contains metal having high strength and high heat conductivity. Especially, when an aluminum case having high heat conductivity is used in the lower case 10, the heat from the LEDs 3 can be diffused to the case efficiently, thereby being able to lower the temperatures of the LEDs 3. Also, in order that the heat spread around the lower case 10 can be emitted to the atmosphere with high efficiency, preferably, the lower case 10 may be disposed on the outer-most periphery of the planar light source unit 21.

The resin frame 8 not only holds the light guide plate 5, reflecting sheet 7 and optical sheet member 6 at their desired positions but also functions as a reflector which reflects the light emitted from the side surface of the light guide plate 5 and thus makes the light enter the side surface of the light guide plate 5 again. A projecting portion provided on the side surface of the light guide plate 5 can be fitted with a recessed portion formed in the resin frame 8 to thereby prevent the light guide plate 5 from shifting in the long side direction thereof. Also, in the resin frame 8, there can be formed mounting screw holes 15, positioning pins and the like which are respectively used to mount the liquid crystal display apparatus 1 and case onto each other. Therefore, the resin frame 8 may be preferably made of a white resin material containing PC or ABS mixed with titanium oxide.

In the liquid crystal display apparatus 1 shown in FIG. 1, the liquid crystal display part 2 is arranged on the opening of the planar light source unit 21. In other words, the liquid crystal display part 2 is arranged on the light emitting surface B of the light guide plate 5 through the optical sheet member 6. The liquid crystal display part 2 to be arranged on the upper portion of the planar light source unit 21 is an image display part that displays images by applying the birefringence of a liquid crystal. As described before, as the image display part to be arranged on the planar light source unit 21, there may also be used a signboard that is formed of a transparent board with the images of characters or pictures printed thereon, or the like.

The liquid crystal display part 2 includes an counter substrate with a color layer (a color filter), a light shield layer (a black matrix), counter electrodes and the like formed thereon, and a TFT array substrate with a thin film transistor (which is hereinafter referred to as a TFT) functioning as a switching element, pixel electrodes and the like formed thereon (neither one of the two substrates is shown). The liquid crystal display part 2 further includes a spacer that is used to hold a clearance formed between the counter substrate and TFT array substrate, a seal member used to stick the counter substrate and TFT array substrate on each other, a liquid crystal to be held by and between the counter substrate and TFT array substrate, a seal member used to seal off a charge port for charging the liquid crystal, a distribution film for distributing the light of the liquid crystal, and a polarizing plate (none of them are shown). According to the embodiment, a general existing liquid crystal display part may be applied, and thus the detailed description thereof is omitted here.

The liquid crystal display apparatus 1 further includes a circuit board 11 (a first member) which is used to drive the liquid crystal display part 2 and LEDs 3. The circuit board 11 includes glass epoxy or the like with a copper pattern formed thereon, while two or more electronic parts are mounted on the circuit board 11 by soldering. The circuit board 11 is disposed mainly on the rear surface side of the planar light source unit 21 and is mechanically fastened to the planar light source unit 21 by a screw 18.

On the lower-most portion of the planar light source unit 21 shown in FIG. 1, there is mounted a protection case 12 (a second member) which is used to protect the circuit board 11 against a mechanical pressure applied from the outside as well as against static electricity. The protection case 12 contains an aluminum material; however, it may contain a stainless steep plate, a galvanized copper plate or the like. Also, on the circuit board 11 side of the protection case 12, there is bonded a non-conductive resin sheet containing PET or the like in order to prevent the protection case 12 from being electrically contacted with the circuit board 11 and electronic parts mounted on the circuit board 11.

The protection case 12 is mechanically fastened to the rear surface of the planar light source unit 21 by a screw (not shown). However, the protection case 12 may also be mechanically fastened to the planar light source unit 21 by other fixing unit such as by caulking. Also, in the protection case 12, there is opened up a hole (not shown) in the vicinity of a variable resistor mounted on the circuit board 11 in order to be able to vary the value of the variable resistor after the protection case 12 is mounted.

When a mechanical pressure or the like applied from the outside is not relatively large, the protection case 12 may be replaced with a PET sheet. In this case, there is eliminated the need to stick a sheet for insulation between the PET sheet and circuit board 11, which makes it possible to reduce the number of parts of the liquid crystal display apparatus 1 and thus the cost thereof.

Next, description will be given below of an optical path through which the light radiated from the LEDs 3 passes until it is emitted from the light emitting surface of the light guide plate 5. Firstly, the light radiated from the LEDs 3 enters the light incident surface A of the light guide plate 5 directly or after it is reflected by the upper case 9 or reflecting sheet 7.

The light, which has entered the light guide plate 5 from the light incident surface A, propagates through the inside of the light guide plate 5 while repeating its total reflection in the boundary between the light guide plate 5 and the air layer. The light propagating through the inside of the light guide plate 5 is diffused and reflected by a dot pattern printing (not shown) which has been performed on the counter light emitting surface C of the light guide plate 5. Since the propagation direction of the light is changed on the counter light emitting surface C of the light guide plate 5, the light having an incident angle, which does not satisfy the critical angle with respect to the boundary between the light guide plate 5 and air layer, can be emitted from the light emitting surface B of the light guide plate 5. The light emitted from the light emitting surface B of the light guide plate 5 enters the liquid crystal display part 2 from the opening through the optical sheet member 6.

A part of the light is emitted from the other surfaces of the light guide plate 5 than the light emitting surface B and such light is reflected by the reflecting sheet 7 which is disposed on the counter light emitting surface C and light incident surface A of the light guide plate 5. The light emitted from the side surfaces of the light guide plate 5 is reflected by the white resin frame 8. Therefore, the above-mentioned light is made to enter the light guide plate 5 again and is not emitted from the other surfaces of the light guide plate 5 than the light emitting surface B.

According to the present embodiment, as shown in FIG. 1, the light guide plate 5 has a flat plate shape. However, the present embodiment is not limited to this. For example, the shape of the light guide plate 5 may also be a wedge shape in which the thickness of the light guide plate 5 decreases as it parts away from the LEDs 3. In this case, the incident light is able to propagate with high efficiency and thus the light can be guided to the light emitting surface B with high efficiency. Also, according to the wedge shape of the light guide plate 5, the amount of the light to be reflected by the reflecting sheet 7 on the counter light emitting surface C can be reduced, which can reduce the reflection loss in the reflecting sheet 7 and thus can increase the amount of the light to be emitted from the light emitting surface B.

Figure 3:
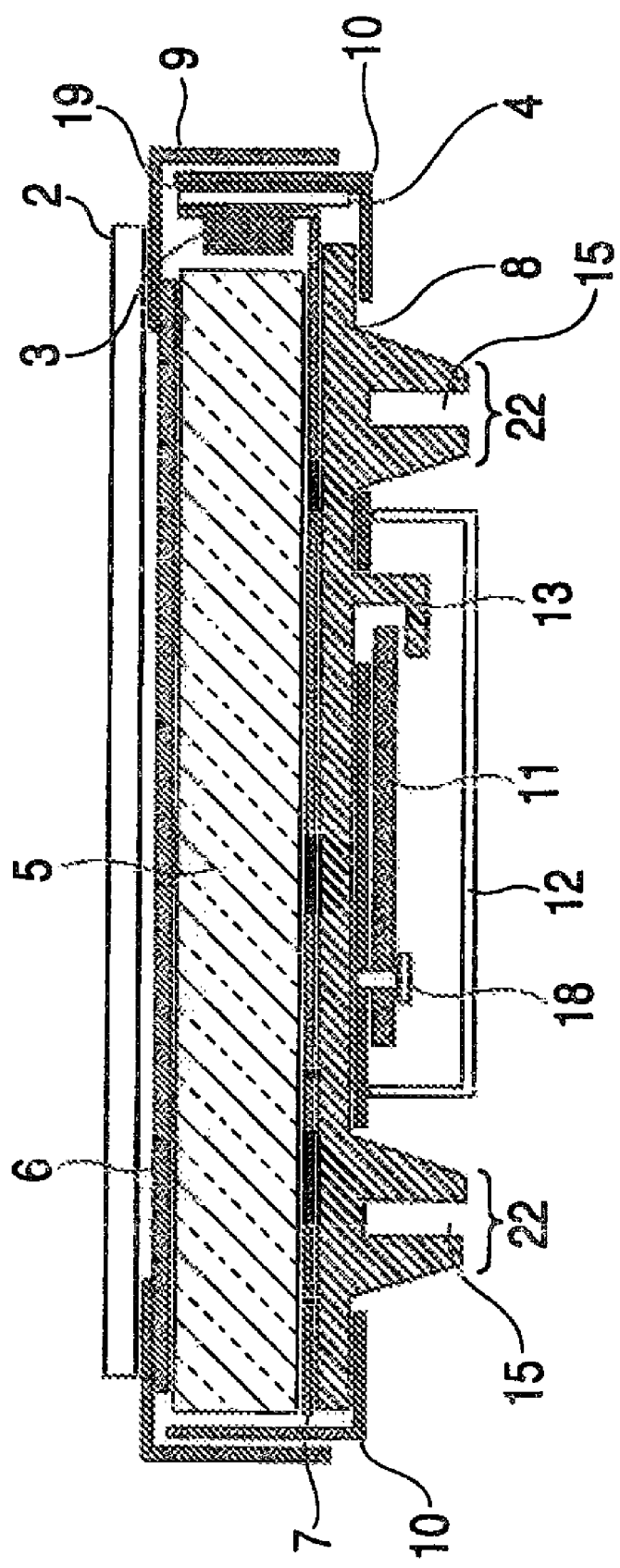
FIG. 3 is a section view of a liquid crystal display apparatus according to an embodiment 1 of the invention.

Next, description will be given below of a method for assembling and mechanically fastening the resin frame 8 and lower case 10 together in the liquid crystal display apparatus 1 according to the present embodiment. Here, FIG. 3 shows a section view of the liquid crystal display apparatus 1, taken along the line III-III shown in FIG. 2 showing a plan view of the liquid crystal display apparatus 1.

Firstly, the resin frame 8 is disposed on the light emitting surface side of the lower case 10. The resin frame 8 includes a surface of a light emitting surface side (a first surface) that holds the light guide plate 5 thereon, and a surface of a counter light emitting surface side (a second surface). On the surface of the counter light emitting surface side (the second surface) of the resin frame 8, there are integrally provided L-shaped pawls A (13) as the restriction member (the first restriction member) of the circuit board 11. Each of the L-shaped pawls A (13) includes a first portion extending substantially perpendicularly from the surface of the counter light emitting surface side of the resin frame 8 and a second portion bent and projected from the first portion so as to extend substantially parallel to the surface of the counter light emitting surface side (the second surface). Thus, the second portion has a surface (a third surface) which is opposed to the surface of the counter light emitting surface side (the second surface) The L-shaped pawls A (13) on the resin frame 8 are respectively mounted so as to project from the counter light emitting surface of the lower case 10, while the counter light emitting surface of the resin frame 8 and the light emitting surface of the lower case 10 can be closely contacted with each other. Besides the L-shaped pawls A (13), with regard to the structurally necessary portions of the outer-most periphery of the planar light source unit 21 such as a mounting screw hole 15, a positioning pin (not shown) and the like formed in the resin frame 8, there are formed holes 20 in the portions of the lower case 10 that correspond to the above portions. Also, the lower case 10 containing metal and the resin frame 8 are greatly different in the thermal expansion coefficient from each other. Especially, at a high temperature, the resin frame 8 expands; and thus, when the inside dimension of the lower case 10 and the outer-most dimension of the resin frame 8 are equivalent to each other, the resin frame 8 is caused to deform, which results in inconveniences such as the lowered display quality. In view of this, in order to prevent such inconveniences from occurring even at a high temperature, preferably, the outer-most dimension of the resin frame 8 may be set slightly smaller than the inside dimension of the lower case 10. Further, preferably, by forming penetration holes (not shown) in the portions of the lower case 10 that correspond to the L-shaped pawls A (13), when forming the resin frame 8 using a mold, there may be eliminated the use of a slide mold, which can simplify the structure of the mold.

Next, the reflecting sheet 7, light guide plate 5 and optical sheet member 6 are respectively set in this order on the resin frame 8. On the right and left portions of the side surface side of the light guide plate 5, there are provided projecting portions; and, in the portions of the resin frame 8 that correspond to such projecting portions, there are formed recessed portions. When the projecting portions of the light guide plate 5 are fitted with the recessed portions of the resin frame 8, the position of the light guide plate 5 can be supported. According to this structure, even when external vibrations or shocks are applied to the planar light source unit 21, the light guide plate 5 can be prevented against movement, which can in turn prevent the other parts such as the LEDs 3 against damage.

As for the optical sheet member 6, when projecting portions and holes (neither of which are shown) formed in the optical sheet member 6 are fitted with the recessed portions and pins formed in the resin frame 8, the position of the optical sheet member 6 can be supported. According to this, even when external vibrations or shocks are applied to the planar light source unit 21, the optical sheet member 6 can be prevented against movement, thereby being able to prevent the parts of the optical sheet member 6 from rubbing against each other and thus from being damaged.

Next, the upper case 9 including the opening is set. The upper case 9 has a function to support the light emitting surface direction positions of the resin frame 8, light guide plate 5 and optical sheet member 6. On the upper case 9, there are provided stopper-shaped portion (not shown) which are used to support the position of the liquid crystal display part 2. Further, on the side surfaces of the upper case 9 and lower case 10, there are provided catch pawls (not shown) or the like. According to this, the upper and lower cases 9 and 10 are mechanically fastened to each other. The position and number of the catch pawls can be determined arbitrarily according to the size of the planar light source unit 21 and the weight of the parts interposed between the lower and upper cases 10 and 9.

On the light emitting surface of the planar light source unit 21, there is disposed the liquid crystal display part 2 in such a manner that the liquid crystal display part 2 is matched to the positioning stopper-shaped portions (not shown) provided on the upper case 9. To the liquid crystal display part 2, there are connected FPCs (not shown) and the like which are used to connect the liquid crystal display part 2 to the circuit board 11.

Next, the circuit board 11 is mounted onto the counter light emitting surface side of the lowercase 10. A resin sheet (not shown) is previously bonded to the portion of the lower case 10 where the circuit board 11 is to be mounted, in order to secure electric insulation between the circuit board 11 and metal-made lower case 10. As the material of the resin sheet, there is used an insulating member such as a PET or the like, while an adhesive material is applied to the light emitting surface side of the resin sheet for adhesion with the lower case 10. Also, the size of the resin sheet may preferably be larger than the outside size of the circuit board 11.

Next, description will be given below of a method for mounting the circuit board 11. The end portion of the circuit board 11 is slided and inserted into a clearance formed between the third surface of the L-shaped pawls A (13) provided on the counter light emitting surface side of the resin frame 8 and the counter light emitting surface side of the lower case 10. For this purpose, the clearance between the L-shaped pawls A (13) and lower case 10 may preferably be almost equal to or larger than the board thickness of the circuit board 11. Here, since the L-shaped pawl A (13) is provided on the surface of the counter light emitting surface side of the resin frame 8 and penetrates through a hole formed in the lower case 10, the above-mentioned clearance is defined by the third surface, the first portion, and the surface of the counter light emitting surface side (the second surface) of the resin frame 8 with respect to the end portion of the circuit board 11. Also, the electronic parts should be mounted on the circuit board 11 while avoiding the portions thereof to be caught by the L-shaped pawls A (13). The end portion of the circuit board 11 that is situated on the opposite side of the L-shaped pawls A (13) is mechanically fastened to the lower case 10 by a screw 18. Finally, the protection case 12 for protecting the circuit board 11 is fastened to the lower case 10 by a screw (not shown) or the like.

In cases where the L-shaped pawls A (13) are not provided on the resin frame 8, when a force going in a direction to connect together the light emitting surface and counter light emitting surface (which is hereinafter referred to as the Z direction shown in FIG. 1) is applied to mounting portions 22 formed in the resin frame 8, pressure is applied to the reflecting sheet 7 and light guide plate 5 to thereby crush the dots of the light guide plate 5, which results in the deteriorated display of the planar light source unit 21.

On the other hand, according to the present embodiment, the L-shaped pawls A (13) are provided on the resin frame 8 and the circuit board 11 is assembled to the lower case 10, thereby restricting the force in the Z direction of the lower case 10 and resin frame 8. Owing to this, the force, which is applied to the mounting portions 22 formed on the resin frame 8 in the Z direction, is supported through the circuit board 11 by the metal-made lower case 10 having high strength, thereby being able to relieve mechanical pressure acting on the reflecting sheet 7 and light guide plate 5. Therefore, the structure employed in the present embodiment, in which the L-shaped pawls A (13) are provided on the resin frame 8 and the circuit board 11 is assembled to the lower case 10, can also provide an effect that the above-mentioned deteriorated display can be prevented.

Also, the fastening member using the L-shaped pawls A (13) restricts only the force acting in the Z direction but does not restrict a force in the X direction or a force in the Y direction. According to this, especially, in the planar light source unit 21 employing a light source capable of generating a great amount of heat such as an LED light source, heat generated from such light source is diffused through the light source substrate 4 and adhesive material 19 to the lower case 10 and thus to the resin frame 8 as well, so that, when the peripheral temperature is high, the resin frame 8 becomes relatively high in temperature. As a result of this, the resin frame 8 can be expanded in the X and Y directions more than the metal-made lower case 10 and the glass-epoxy-made circuit board 11. Even in this case, however, because the two ends of the resin frame 8 as well as the two ends of the circuit board 11 and lower case 10 are not restricted by the screw 18 or the like in the X and Y directions, the resin frame 8 can be freely compressed in the X and Y directions. This makes it possible to provide an image display apparatus employing the planar light source unit 21 which, even at a high temperature, is not mechanically distorted so much but is highly reliable.

According to the present embodiment, the L-shaped pawls A (13) are disposed in two portions. However, the number of such portions is not limited to two but one or more portions may also provide a similar effect. In addition, according to the embodiment 1, as the shape of the section of the L-shaped pawl A (13), there is employed an "L" shape. However, it is also possible to employ another shape, such as a "T" shape, provided to be capable of having the above-mentioned third surface substantially parallel to the surface of the counter light emitting side of the resin frame 8.

Also, as the method for mechanically fastening together the lower case 10 and resin frame 8 according to the present embodiment, a method used in a planar light source unit in which a lower case and a resin frame are fastened together by providing pawls on the side surfaces of such light source unit and by catching such pawls. According to this method, the thicknesses of the side surfaces of the planar light source unit can be reduced and thus the frame size of the planar light source unit can be narrowed.

Embodiment 2

Figure 4:
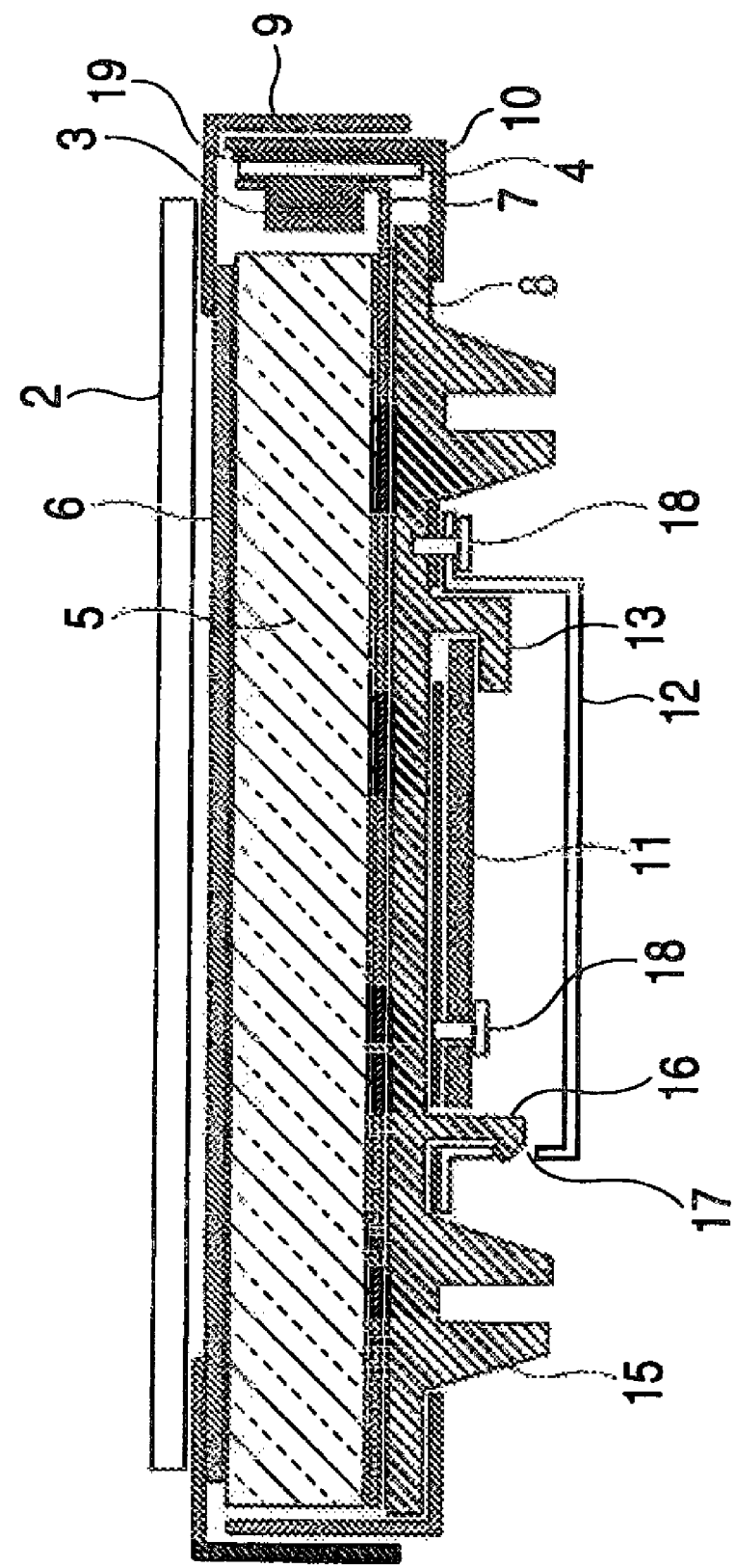
FIG. 4 is a section view of a liquid crystal display apparatus according to an embodiment 2 of the invention.

FIG. 4 is a section view of a liquid crystal display apparatus according to an embodiment 2 of the invention. The liquid crystal display apparatus according to the present embodiment, a protection case 12 (a second member) for a circuit board 11 (a first member) is mounted onto a lower case 10. Therefore, with regard to its assembling method and structure, up to the step of mounting the circuit board 11 to the lower case 10, the present embodiment is basically similar to the above-mentioned embodiment 1 and thus, in order to avoid duplicate and redundant description, the detailed description thereof is omitted here.

According to the present embodiment, on the resin frame 8, besides the L-shaped pawls A (13) for fixing a circuit board, there is provided another L-shaped pawl B (16) (a fixing member) for fixing the protection case 12. Also, in the side surface of the protection case 12, there is formed an L-shaped pawl B hole 17 into which the L-shaped pawl B (16) of the resin frame 8 can be inserted.

After a circuit board is inserted into the L-shaped pawls A (13), when mounting the protection case 12, the L-shaped pawl B (16) of the resin frame 8 is inserted into the L-shaped pawl B hole 17 provided on the protection case 12. The portion of the L-shaped pawl B (16) that is firstly contacted with the protection case 12 is tapered so that the L-shaped pawl B (16) can be deformed when mounting the protection case 12. That is, while mounting the protection case 12, the L-shaped pawl B (16) is deformed and, when the protection case 12 is set at a given position, the L-shaped pawl B (16) is inserted into the L-shaped pawl B hole 17 of the protection case 12. After then, the other end of the protection case 12 is mechanically fastened to the lower case 10 and resin frame 8 using a screw 18 or the like. As a result of this, the protection case 12 is mechanically fastened to the planar light source unit 21 and, at the same time, similarly to the before-mentioned embodiment 1, the resin frame 8 and lower case 10 are fastened together in the Z direction. Thus, the present embodiment provides an effect that the protection case 12 can be assembled simply without using other many members than the screw or the like. The other effects of the present embodiment than this are similar to those of the embodiment 1 and thus the description thereof is omitted here.

Also, the fastening member using the L-shaped pawl B (16) restricts only the force acting in the Z direction but does not restrict a force in the X direction or a force in the Y direction. According to this, especially, in the planar light source unit 21 employing a light source capable of generating a great amount of heat such as an LED light source, heat generated from such light source is diffused through the light source substrate 4 and adhesive material 19 to the lower case 10 and thus to the resin frame 8 as well, so that, when the peripheral temperature is high, the resin frame 8 becomes relatively high in temperature. As a result of this, the resin frame 8 can be expanded in the X and Y directions more than the metal-made lower case 10 and protection case 12. Even in this case, however, because the two ends of the resin frame 8 as well as the two ends of the lower case 10 and protection case 12 are not restricted by the screw 18 or the like in the X and Y directions, the resin frame 8 can be freely compressed in the X and Y directions. This makes it possible to provide an image display apparatus employing the planar light source unit 21 which, even at a high temperature, is not mechanically distorted so much but is highly reliable.

According to the present embodiment, there are used the L-shaped pawls A (13) and L-shaped pawls B (16) in combination. However, use of only the L-shaped pawls B can also provide the above effect. Also, the position, number and shape of the respective L-shaped pawls can be decided arbitrarily depending on the whole structure of the image display apparatus.

Embodiment 3

Figure 5:
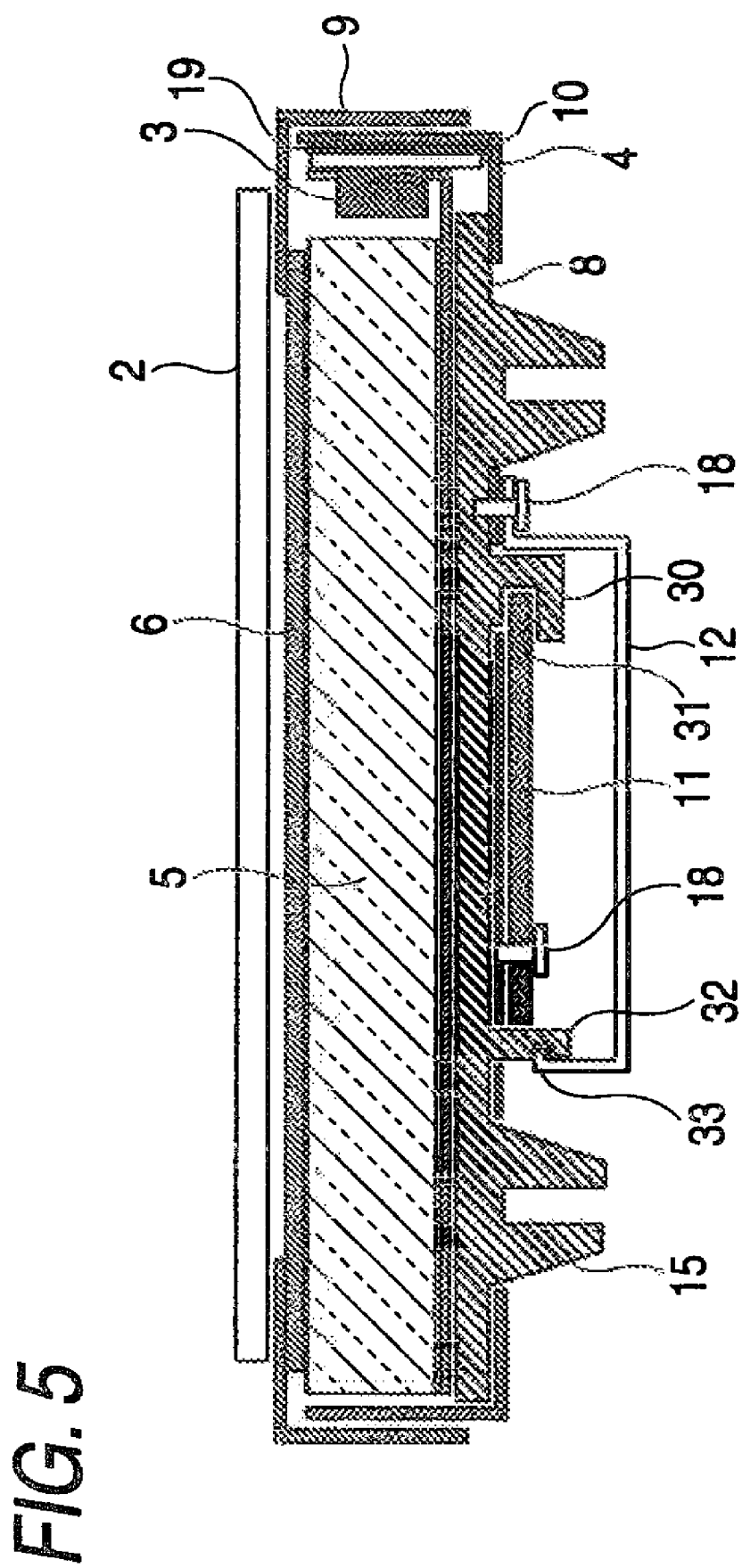
FIG. 5 is a section view of a liquid crystal display apparatus according to an embodiment 3 of the invention.

FIG. 5 shows a section view of a liquid crystal display apparatus according to an embodiment 3 of the invention. The liquid crystal display apparatus according to this embodiment includes a groove in the side surface of a projecting portion 30 (a first restriction member) that is extended substantially perpendicularly from the counter light emitting surface side of the resin frame 8, and a groove in the side surface of the projecting portion 32, instead of the L-shaped pawl-like members such as the L-shaped pawl A (13) and L-shaped pawl B (16) respectively provided in the above-mentioned embodiments 1 and 2. By inserting the circuit board 11 and protection case 12 into these grooves, the circuit board 11 and protection case 12 are fastened to the resin frame 8. The assembling methods and structures of other composing members are similar to the above-mentioned embodiment 1 and thus, in order to avoid duplicate and redundant description, the detailed description thereof is omitted here.

In FIG. 5, with the side surface of the projecting portion 30 (a first portion) which is extended substantially perpendicularly from the counter light emitting surface side of the resin frame 8, there is fitted the circuit board 11 to thereby form a groove (a second portion) having given width and depth which corresponds to the board thickness and length of the circuit board 11. More specifically, in order to hold the circuit board 11 on the resin frame 8, the groove is formed in the side surface (the first portion) of the projecting portion 30 extended substantially perpendicularly from the counter light emitting surface side of the resin frame 8, and also includes a surface 31 (a third surface) opposed to the counter light emitting surface side surface 31 (a second surface). The end portion of the circuit board 11 is fitted into a clearance formed between the surface 31 and the counter-light-emitting-surface side of the lower case 10. For this reason, the width of the groove and the clearance formed between the third surface 31 and lower case 10, preferably, may be substantially equal to or more than the board thickness of the circuit board 11. Here, since the projecting portion 30 is disposed on the counter light emitting surface side of the resin frame 8 and penetrates through the hole formed in the lower case 10, the above clearance is defined by the third surface, the projecting portion 30, and the surface of the counter light emitting surface side (the second surface) of the resin frame 8 with respect to the end portion of the circuit board 11.

Also, in the side surface of a projecting portion 32 (a fixed member) which is extended substantially perpendicularly from the counter-light-emitting-surface side of the resin frame 8, there is formed a groove into which the protection case 12 can be fitted. The end portion 33 of the protection case 12 has an L-like shape which is bent inwardly in correspondence to the groove. The groove has such given width and depth that allow the end portion 33 to be fitted with the groove.

The positions of the projecting portions 30 and 32 as well as the groove and depth of the groove are set at given values with the difference of the thermal expansion coefficients between the resin frame 8 and circuit board 11 as well as variations in the dimensions thereof taken into consideration.

Also, in the fitting engagement using the grooves formed in the projecting portions 30 and 32, by properly setting the positions of the projecting portions as well as the width and depth of the grooves, it is possible that only the forces acting on the circuit board 11 and protection case 12 in the Z direction are restricted but the forces acting in the X and Y directions are not restricted.

Embodiment 4

Figure 6:
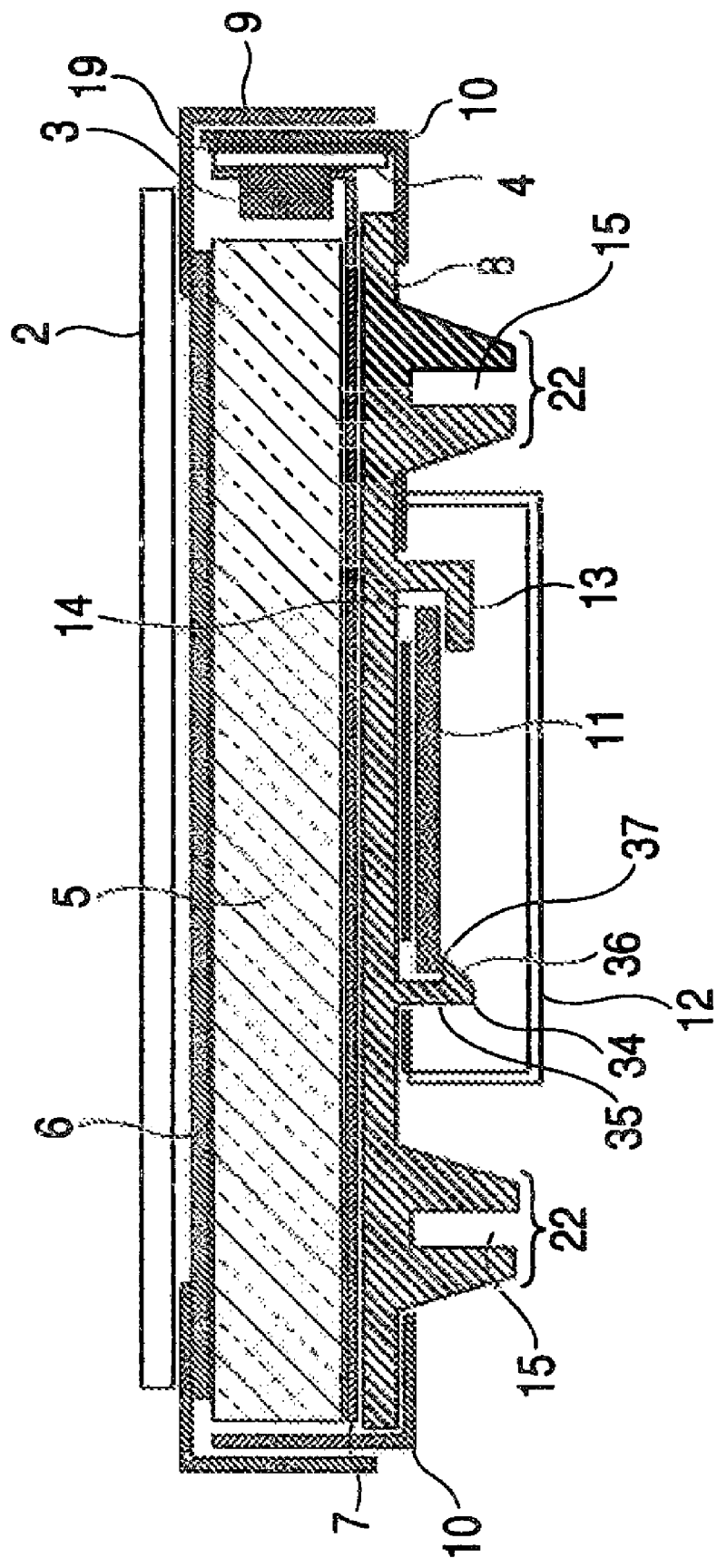
FIG. 6 is a section view of a liquid crystal display apparatus according to an embodiment 4 of the invention.

FIG. 6 shows a section view of a liquid crystal display apparatus according to an embodiment 3 of the invention. In the liquid crystal display apparatus according to this embodiment, the circuit board 11 is held on the resin frame 8 by an L-shaped pawl C (34) (a second restriction member) which is projected from the counter light emitting surface side of the resin frame 8, instead of the screw 18 used in the above-mentioned embodiments 1 to 3. The assembling methods and structures of other composing members are similar to the above-mentioned embodiment 1 and thus, in order to avoid duplicate and redundant description, the detailed description thereof is omitted here.

In FIG. 6, the L-shaped pawl C (34), which is projected from the counter light emitting surface side of the resin frame 8, includes a third portion (35) extending substantially perpendicularly from the counter light emitting surface side of the resin frame 8 and a fourth portion (36) bent and projected from the third portion so as to extend substantially parallel to the surface (the second surface) of the counter light emitting surface side. Therefore, the fourth portion includes a surface 37 (a fourth surface) which is opposed to the surface (second surface) of the counter light emitting surface side.

Next, description will be given below of a method for mounting the circuit board 11. Firstly, similarly to the above-mentioned embodiment 1, one end of the circuit board 11 is inserted into a clearance formed between the third surface formed on the L-shaped pawl A (13) provided on the counter light emitting surface side of the resin frame 8 and the counter light emitting surface side of the lower case 10. For this purpose, the clearance between the L-shaped pawl A (13) and lower case 10, preferably, may be substantially equal to or more than the board thickness of the circuit board 11. Also, electronic parts are to be mounted onto the circuit board 11 while avoiding the portions of the circuit board 11 by which the L-shaped pawl A (13) can be caught.

Next, while the third portion (35) of the L-shaped pawl C (34) is once flexed slightly outward, for example, by the manual operation of an assembly operator to thereby avoid interference between the other end (L-shaped pawl C side end) of the circuit board 11 and the L-shaped pawl C (34), the other end of the circuit board 11 is inserted into a clearance formed between the surface of the counter light emitting surface side (second surface) of the lower case 10 and the above-mentioned surface 37. After then, when the operator releases his or her hand from the L-shaped pawl C (34), the other end of the circuit board 11 and lower case 10 are fastened together mechanically. For this purpose, the clearance between the L-shaped pawl C (34) and lower case 10, preferably may be substantially equal to or more than the board thickness of the circuit board 11. Here, since the L-shaped pawl C (34) is provided on the counter light emitting surface side of the resin frame 8 and penetrates through the hole formed in the lower case 10, the clearance can be defined by the fourth surface, the third portion (35), and the surface of the counter light emitting surface side (the second surface) of the resin frame 8 with respect to the other end portion of the circuit board 11.

Finally, the protection case 12 for protecting the circuit board 11 is fastened using a screw (not shown) or the like.

Also, in the fastening operation using the L-shaped pawl C (34), by properly setting the position of the third portion and the dimension of the fourth portion, it is possible that only the forces acting on the circuit board 11 and protection case 12 in the Z direction are restricted but the forces acting in the X and Y directions are not restricted. Accordingly, there can be provided an image display apparatus incorporating therein the planar light source unit 21 which, even at high temperatures, can reduce mechanical distortion and also can provide enhanced reliability.

Although, in the embodiment 4, description has not been given specially of the number of the L-shaped pawls C (34), it is obvious that one or more L-shaped pawls C (34) can provide a similar effect. Also, in the embodiment 4, as the shape of the section of the L-shaped pawl C (34), there is employed the "L" shape. However, it is possible to employ other shape, such as a "T" shape, provided to be capable of having the surface 37 (the fourth surface) which is substantially parallel to the counter-light-emitting-side surface of the resin frame 8.

The point source of light used in the embodiments 1 to 4 is not limited to an LED. Further, it goes without saying that a light source capable of generating white light by mixing together red, green and blue can be applied to the respective embodiments of the invention. It is also possible to use a linear source of light such as a cold cathode fluorescent lamp or the like, instead of the point source of light. In the above-mentioned embodiments, description has been given heretofore of the planar light source unit 21 which uses the light guide plate. However, a planar light source of a just below type, in which a light source is disposed just below the light emitting surface without using a light guide plate, of course, can also provide a similar effect.

Also, in the above-mentioned embodiments 1 to 4, there is shown an example of a liquid crystal display apparatus in which the liquid crystal display part 2 is disposed on the planar light source unit 21. However, the present invention is not limited to this but, instead of the liquid crystal display part 2, there may also be used an image display part (for example, a signboard or a guide lamp) which displays images using the light of the planar light source unit 21.

Further, as described above, in the embodiments 1 to 4, there is used an LED as a source of light. However, besides the LED, there may also be used a point source of light such as a laser diode.

Moreover, as the LED, there can be used a semiconductor light emitting element which emits a single color such as blue or the like, or a fluorescent body which absorbs part of blue light generated from a semiconductor light emitting element to thereby emit yellow. Also, as described above, as the LED, there can be used an LED which includes red, green and blue elements and emits three single color lights or emits a white light as a composite light of the three colors. In the present embodiments, the pseudo white LED is used as the LED.

Also, in the embodiments 1 to 4, description has been given of an example in which the distortion of the resin frame 8 at a high temperature is reduced. However, it goes without saying that, even for the distortion of the resin frame 8 at a low temperature as well, the method disclosed in the embodiments 1 and 2 can also provide a similar effect. Also, in the embodiments 1 to 4, the circuit board 11 is fixed to the lower case using the screw or L-shaped pawl. However, the circuit board 11 may also be fastened to the planar light source unit 21 using other fixing members such as a caulking member.

Further, description will be given here of the modifications of the above-mentioned embodiments 1 to 4. Specifically, in the embodiments 1 to 3, as described above, there is interposed a resin sheet (not shown) between the lower case 10 and circuit board 11 to thereby secure electric insulation. However, when the mechanical strength of the lower case 10 can be secured, the lower case 10 may be cut away in part so as to correspond to substantially the whole of the circuit board 11 except for the screw hole portion through which the screw 18 penetrates. This makes it possible to secure the electric insulation without use of the resin sheet. In this case, there is eliminated the formation of the hole 14 for the L-shaped pawl A (the hole is contained in the cut-away portion). In the modification of the embodiment 4, since the circuit board 11 is fastened to the resin frame 8 using the L-shaped pawl C instead of the screw, the cut-away portion provides a portion which corresponds to the whole of the circuit board 11.

The planar light source unit of the embodiments can realize a display apparatus that is tolerant of an influence of the expansion and compression of the composing members thereof due to variations in temperature.

What is claimed is:

1. A planar light source unit comprising:
   a light source;
   an upper case having an opening through which the light is emitted from the light source;
   a lower case fitted with the upper case and including a hole;
   a light guide plate disposed inside the upper case and the lower case;
   a resin frame including a first surface that holds the light guide plate, a second surface opposed to the first surface, a first restriction member penetrated through the hole of the lower case, the first restriction member including a first portion extending from and substantially perpendicular to the second surface, and a second portion contacted with a portion of the first portion, the second portion having a main surface extending substantially parallel to the second surface; and
   a first member, a part of which is inserted into a clearance defined by the second surface, the first portion and the main surface.

2. The planar light source unit according to claim 1, wherein the first member has a different heat expansion coefficient from that of the resin frame.

3. The planar light source unit according to claim 1, wherein the first member is a circuit board that drives a liquid crystal display part or the light source.

4. The planar light source unit according to claim 1, further comprising a second member that protects the first member and includes a hole,
   wherein the resin frame further includes a fixing member extending from the second surface to fit the hole of the second member.

5. The planar light source unit according to claim 1, wherein the light source includes point light source, and a light source substrate held in close contact with the side surface of the lower case and including the point light source mounted thereon and a wiring pattern for driving the point light source.

6. The planar light source unit according to claim 5, wherein the light source substrate is held on the lower case using an adhesive material.

7. The planar light source unit according to claim 5, wherein the point light source includes light emitting diode.

8. The planar light source unit according to claim 1, wherein:
   the resin frame comprises a second restriction member that is penetrated through the hole of the lower case and includes a third portion extending from and substantially perpendicular to the second surface and a fourth portion contacted with a portion of the third portion and having a main surface opposed to the second surface; and
   an end of the first member is inserted into a clearance defined by the second surface, the first portion and the main surface of the second portion, and the other end of the first member is inserted into a clearance defined by the third portion and the main surface of the fourth portion.

9. An image display apparatus comprising:
   a planar light source unit; and
   an image display part disposed on the planar light source unit for displaying images using the light radiated from the planar light source unit,
   wherein the planar light source unit comprises:
   a light source;
   an upper case having an opening through which the light is emitted from the light source;
   a lower case fitted with the upper case and including a hole;
   a light guide plate disposed inside the upper case and the lower case;
   a resin frame including a first surface that holds the light guide plate, a second surface opposed to the first surface, a first restriction member penetrated through the hole of the lower case, the first restriction member including a first portion extending from and substantially perpendicular to the second surface, and a second portion contacted with a portion of the first portion, the second portion having a main surface extending substantially parallel to the second surface; and
   a first member, a part of which is inserted into a clearance defined by the second surface, the first portion and the main surface.

* * * * *